(12) United States Patent
Hoshiba et al.

(10) Patent No.: US 6,174,264 B1
(45) Date of Patent: Jan. 16, 2001

(54) MARINE PROPULSION CONTROL

(75) Inventors: Akihiko Hoshiba; Keisuke Iguchi, both of Hamamatsu (JP)

(73) Assignee: Sanshin Kogyo Kabushiki Kaisha, Hamamatsu (JP)

( * ) Notice: Under 35 U.S.C. 154(b), the term of this patent shall be extended for 0 days.

(21) Appl. No.: 09/031,329

(22) Filed: Feb. 26, 1998

(30) Foreign Application Priority Data

Feb. 26, 1997 (JP) ...................................................... 9-041902

(51) Int. Cl.⁷ .................................................. B60K 41/08
(52) U.S. Cl. ............................ 477/102; 477/111; 477/112
(58) Field of Search ..................................... 477/111, 112, 477/113, 905, 101, 102, 105, 107

(56) References Cited

U.S. PATENT DOCUMENTS

| | | | |
|---|---|---|---|
| 4,718,014 | * 1/1988 | Kobayashi et al. | 477/102 X |
| 5,373,821 | * 12/1994 | Nishi et al. | 477/102 X |
| 5,403,246 | * 4/1995 | Umemoto | 477/101 |
| 5,795,266 | * 8/1998 | Hasegawa et al. | 477/905 X |
| 5,833,572 | * 11/1998 | Leising et al. | 477/102 X |

* cited by examiner

Primary Examiner—Sherry Estremsky
(74) Attorney, Agent, or Firm—Knobbe, Martens, Olson & Bear LLP

(57) ABSTRACT

A control for a marine propulsion unit including a water propulsion device powered by an engine through a transmission. The transmission has forward, neutral and reverse positions. The engine has at least one combustion chamber, an air and fuel supply system, and at least one ignition element corresponding to the combustion chamber for igniting an air and fuel mixture supplied to the combustion chamber. The control is arranged to delay the firing of the ignition element when the engine is idling from a normal firing timing, and arranged to advance the firing of the ignition element if the engine speed rapidly reduces and the position of the transmission is changed from neutral to reverse or forward.

10 Claims, 4 Drawing Sheets

MARINE PROPULSION CONTROL

FIELD OF THE INVENTION

The present invention relates to a control for a marine propulsion unit. More particularly, the present invention is a control which changes one or more operating conditions of an engine of the marine propulsion unit dependent upon a condition of a transmission of the unit.

BACKGROUND OF THE INVENTION

Watercraft are often powered by inboard or outboard motors which have internal combustion engines as their power source. The motor includes a water propulsion device, generally a propeller, which is driven by the engine. Conventionally, a transmission is provided between the engine and propeller for selectively driving the propeller in forward or reverse, or for not driving the propeller (i.e. neutral).

A throttle associated with the engine and a transmission control are commonly combined, there being a combined throttle and shift lever which controls both the angle of a throttle valve associated with an air intake of the engine and transmission position. This arrangement has the disadvantage that engine stall sometimes occurs.

In particular, when the shift lever is moved so that the throttle moves from an open to generally closed state, little air is provided to the engine in relation to fuel. If the shift lever is further moved to shift the transmission, a load may be induced upon the propeller, and thus the engine. This load, coupled with the fuel rich mixture, may cause the engine to stall. This situation may arise, for example, when an operator has the shift lever positioned in a high speed forward position and then moves the lever quickly back through neutral and then into a reverse position.

It is an object of the present invention to provide a control for a marine propulsion unit which controls the engine thereof dependent upon movement of a combined throttle and shift lever, thereby resulting in smooth engine operation.

SUMMARY OF THE INVENTION

The present invention is a control for a marine propulsion unit. Preferably, the marine propulsion unit is an outboard motor including a water propulsion device powered by an engine through a transmission. The transmission has forward, neutral and reverse positions.

The engine has at least one combustion chamber and an air and fuel supply system for supplying an air and fuel charge to the combustion chamber. At least one ignition element is provided corresponding to the combustion chamber for igniting an air and fuel mixture supplied to the combustion chamber.

The control is arranged to delay the firing of the ignition element when the engine is idling from a normal firing timing, and is arranged to advance the firing of the ignition element if the engine speed rapidly reduces and the position of said transmission is changed from neutral to reverse or forward.

Preferably, the air supply system of the engine includes an intake passage having a throttle valve movably positioned therein. The throttle valve and transmission position are controlled through a combined throttle and shift lever. In one lever position, the transmission is in neutral and the throttle valve is set to an engine idle position. In this position, the control is arranged to delay the ignition element firing timing. When the lever is moved from this position to the forward or reverse position, the control is arranged to advance the firing timing.

Further objects, features and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
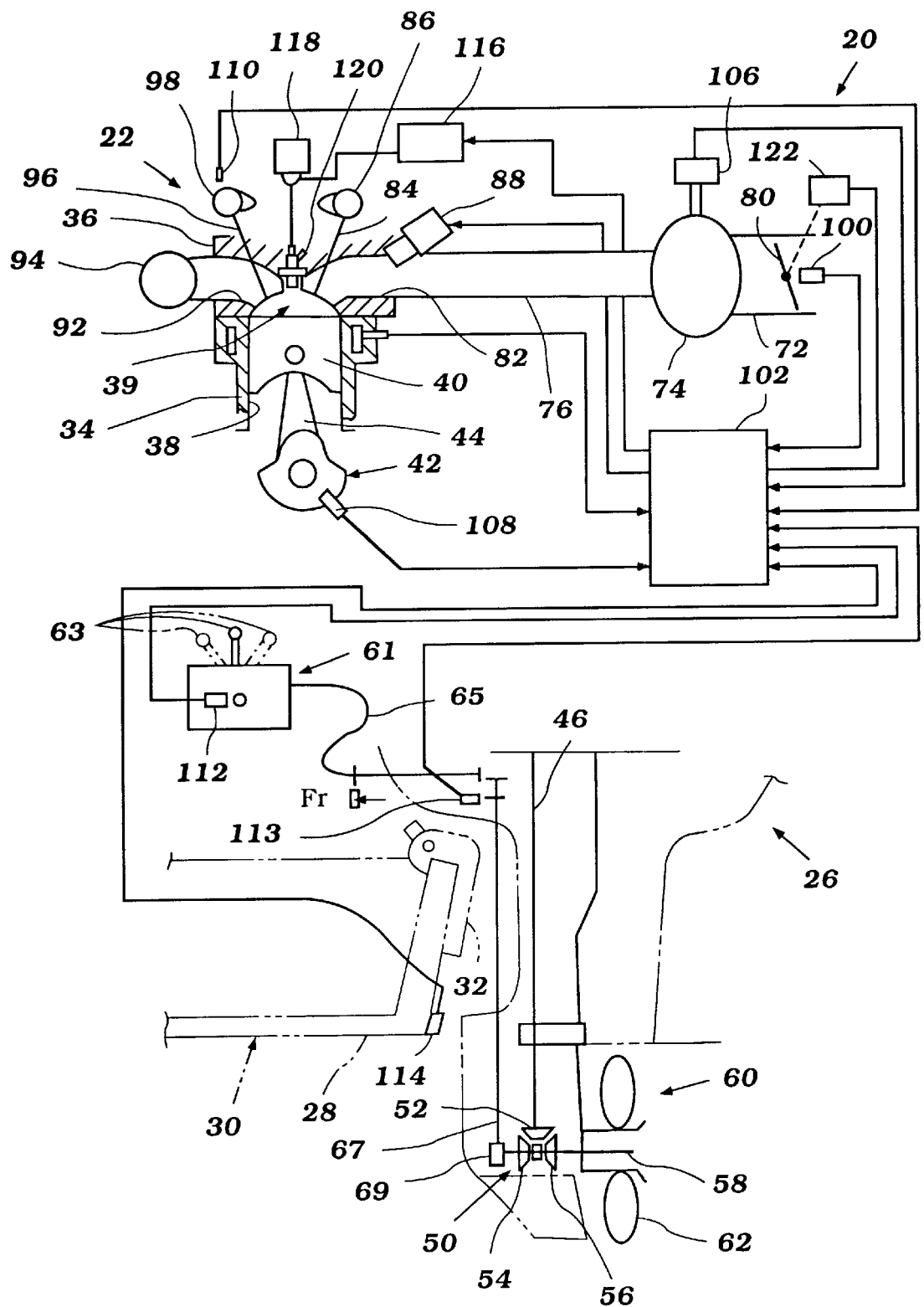
FIG. 1 schematically illustrates an engine powering a water propulsion device of an outboard motor having a control in accordance with the present invention.
Figure 2:
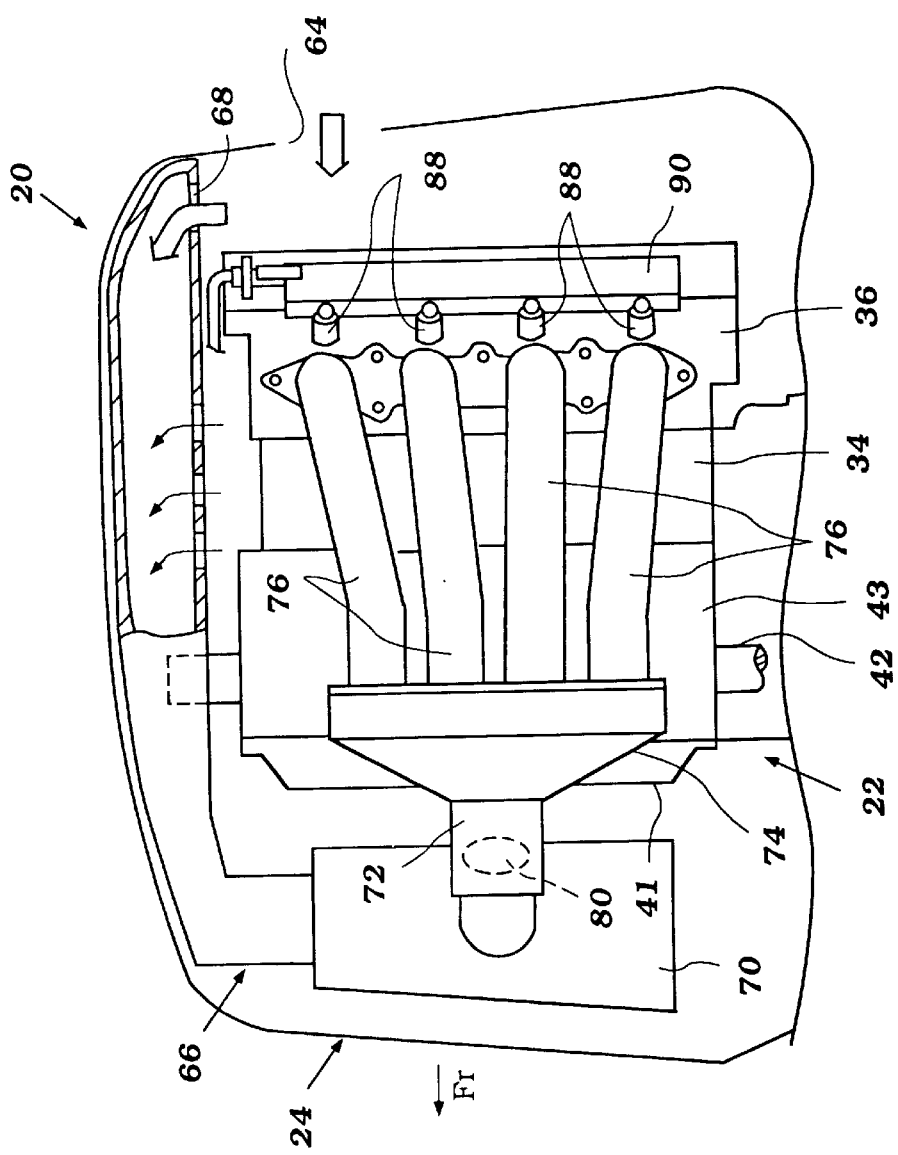
FIG. 2 is a cross-sectional view of a top portion of the motor illustrated in FIG. 1 exposing a portion of the engine positioned in a cowling thereof.

The present invention is a control for a marine propulsion unit. As illustrated in FIGS. 1 and 2, the marine propulsion unit is an outboard motor 20 powered by an engine 22. The control of the present invention is described with an engine 22 utilized to power an outboard motor 20 since this is an application for which the control has particular utility. As may be appreciated by one skilled in the art, the control may be used in a variety of other applications, such as for controlling an inboard mounted engine of a watercraft having a propulsion unit driven by the engine through a transmission.

In general, and as described in more detail below, the control of the present invention is arranged to control an ignition firing characteristic of the engine dependent upon a change in shift lever position of a transmission.

Referring to FIGS. 1 and 2, the outboard motor 20 has a powerhead which comprises the engine 22 positioned in a cowling 24. A lower unit 26 extends below the powerhead. The outboard motor 20 is connected to the hull 28 of a watercraft 30, preferably at a transom portion of the watercraft 30. The motor 20 is connected to the watercraft 30 by a clamping bracket 32. Preferably, the motor 20 is connected to the clamping bracket 32 in a manner which permits side-to-side movement about a vertically extending axis for permitting steering of the watercraft 30 with the motor, and in a manner which permits movement up and down about a horizontally extending axis for permitting trimming of the motor 30. These mountings are well known to those skilled in the art.

The engine 22 includes a cylinder block 34 having a cylinder head 36 connected thereto and cooperating therewith to define a plurality of cylinders 38, each cylinder including a combustion chamber portion 39. As is known to those skilled in the art, the engine 22 may have any number of cylinders 38.

In the present embodiment, the engine 22 preferably operates on a four-cycle principle and includes a piston 40 movably mounted in each cylinder 38. Each piston 40 is connected to a crankshaft 42 which is journalled for rotation with respect to the remainder of the engine 22 via a connecting rod 44. The crankshaft 42 is preferably positioned in a crankcase chamber defined by the block 34 opposite the cylinder head 36 and enclosed with a crankcase cover 43 cooperating with an oil pan 41.

The crankshaft 42 is generally vertically extending, and likewise the cylinders 38 are preferably arranged in in-line fashion. As known to those skilled in the art, the engine 22 may be arranged in other orientations, such as a "V" arrangement. In addition, the engine 22 may be of the rotary type.

As illustrated in FIG. 1, the crankshaft 42 is preferably arranged to drive a drive shaft 46 which extends through the lower unit 26 of the motor 20 to drive a means for propelling water. In the embodiment illustrated, the drive shaft 46 extends to a forward-neutral-reverse transmission 50. This transmission 50 may be of a variety of types. As illustrated, the transmission 50 includes a bevel gear 52 mounted on the end of the drive shaft 46 for selective engagement with forward and reverse bevel gears 54,56 mounted for relative rotation with respect to a propeller drive shaft 58.

The propeller drive shaft 58 extends to the means for propelling water, which in the present invention is illustrated as a propeller 60 having at least one blade 62.

A operation device 61 is provided for permitting the operator of the watercraft 30 to shift the transmission 50 between forward, neutral and reverse positions. As illustrated, the device 61 includes a shift lever 63 moveable between F, N and R positions corresponding to forward, neutral and reverse transmission positions, respectively. The shift lever 63 is connected via a shift cable 65 to a shift rod 67 extending through the lower unit 26 of the motor 20 to the transmission 50. As illustrated, the shift rod 67 is arranged to rotate and move teeth on the drive shaft 58 associated with a dog clutch mechanism 69 into engagement with the forward or reverse bevel gears 54,56 (or into a position in which neither gear 54,56 is engaged in a neutral position).

Air is provided to each cylinder 38 for use in a fuel combustion process. Referring to FIG. 2, air is drawn through a vent 64 in the cowling 24 of the motor 20. The air entering the cowling 24 is then drawn into an inlet 68 into an intake system 66. In the embodiment illustrated, the air is routed through a passage extending across the top of the engine 22 to a surge tank 70.

Air is drawn from the surge tank 70 through a throttle body 72 and delivered into a manifold 74 which includes individual runners 76 corresponding to the combustion chamber of each cylinder 38. The rate of air flow to the cylinders 38 of the engine 22 is preferably governed by a throttle plate 80 movably mounted in a passage through the throttle body 72. This plate 80 is preferably remotely movable by the shift lever 63 of the watercraft 30 from a position in which the plate 80 generally obstructs the passage and other positions in which the throttle plate 80 generally does not obstruct the passage.

Each runner 76 has a passage therethrough leading to a passage 82 through the cylinder head 36 to an intake port of a cylinder 38. As illustrated in FIG. 1, means are provided for controlling the timing of the flow of air into each cylinder 38. Preferably, this means comprises an intake valve 84 having one end positioned in the intake port. The valve 84 is preferably actuated between one position in which is obstructs or closes the port and a second position in which the port is opened by an intake camshaft 86.

Preferably, the intake camshaft 86 is arranged to actuate the intake valve 84 corresponding to all of the cylinders 38. Means are provided for driving the camshaft 86, as well known in the art. For example, this means may comprises a chain or belt extending from the crankshaft 42 to the camshaft 86 whereby the crankshaft 42 drives the camshaft 86.

Fuel is also supplied to the cylinder 38 for combustion therein. Preferably, the fuel is supplied through a suitable charge former, such as a fuel injector 88. As illustrated, a fuel injector 88 is provided corresponding to each runner 76 and delivers fuel into the air passing through the passage 82 corresponding thereto.

Fuel is supplied to each fuel injector 88 by a fuel supply system which preferably includes means for delivering fuel from a supply to the injector 88 at high pressure. The fuel is preferably supplied to the injectors 88 through a fuel rail 90 extending generally vertically along the cylinder head 38 of the engine 22.

Products of the combustion process are routed from each cylinder 38 through an exhaust port leading to an exhaust passage 92. The exhaust passage 92 leading from each cylinder 38 preferably extends to a common exhaust passage 94 leading to a point external to the motor 20.

Means are provided for controlling the flow of exhaust from each cylinder 38 to its respective exhaust passage 92. Preferably, this means comprises an exhaust valve 96 having one end positioned in the exhaust port. The exhaust valve 96 is moveable between a first position in which it obstructs or closes the exhaust port and prevents the flow of exhaust therethrough, and a second open position in which exhaust is permitted to flow from the cylinder 38 to the exhaust passage 92. Preferably, the valve 96 is actuated by an exhaust camshaft 98. The camshaft 98 is preferably driven in like manner to the intake camshaft 86.

The details of the remainder of the exhaust system are not provided herein as they form no part of the present invention, and are well known to those skilled in the art.

The engine 22 preferably includes a cooling system as is also well known in the art and will not be described in any detail.

The motor 20 includes a control unit 102 for controlling various engine and related motor functions. Preferably, the control is of the type which receives information from various sensors and utilizes the data from these sensors to control the various functions.

As illustrated in FIG. 1, a throttle plate sensor 100 preferably provides data regarding the position of the throttle plate 80 to the control unit or ECU 102. An intake air pressure sensor 106 in communication with the intake system 74 provides air pressure data to the ECU 102. A crankshaft angle sensor 108 is provided for monitoring the speed and angle of the crankshaft 42, and a cylinder distinguishing sensor 110 is preferably provided for determining the position of the piston 40 of at least one of the cylinders 38. As is known to those skilled in the art, by knowing the position of one of the pistons 40 and the angular position of the crankshaft 42 it is possible to determine the position of the piston of every cylinder 38 of the engine 22 at a given time.

An operation device speed sensor 112 is provided for sensing the speed at which the operation device is moved into the F, N or R positions and sending the speed data to the ECU 102.

A shift position sensor 113 is provided for determining the rotational position of the shift rod 67 for providing shift position data to the ECU 102. As may be understood, the shift rod 67 does not have such distinct positions corresponding to the shift positions as does the shift lever 63. As such, this sensor 113 generally provides a linear output relative to the rotational position of the rod with respect to the sensor 113.

A watercraft speed sensor 114 provides data to the ECU 102 regarding the speed of the watercraft 30.

Based on the sensor data, the ECU 102 controls an ignition circuit 116 which triggers an ignition coil 118 for firing of a spark plug 120 corresponding to each cylinder 38. In this manner, combustion within each cylinder 28 is controlled.

In accordance with the present invention, the ECU or control 102 controls the engine 22 in accordance with a specific arrangement dependent upon the position and movement of the shift lever 63.

Figure 3:
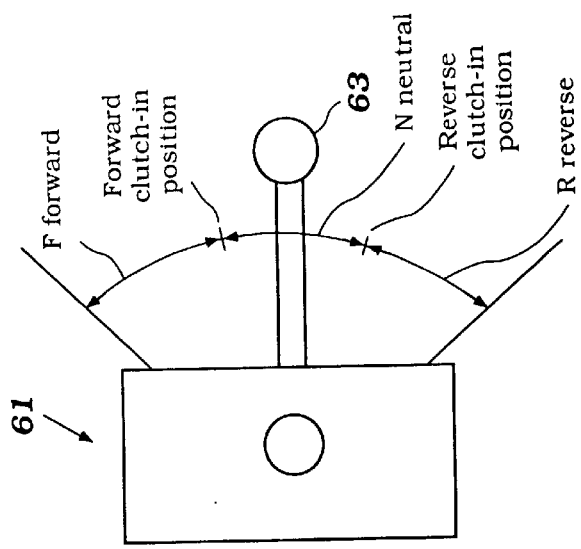
FIG. 3 schematically illustrates various regions of travel of a shifter associated with a transmission of the motor.

FIG. 3 illustrates the different ranges of the operation device 61 and the various modes of operation for different positions of the shift lever 63. The full range of travel of the shift lever 63 is shown by the arc which will be described more fully below. As illustrated in this figure, the shift lever 63 is shown in the neutral position. The neutral position is preferably limited to the range of travel by the arc 30° in both the forward and the rearward direction. In the neutral position the transmission 50 is typically not engaged.

As the operator of the watercraft moves the shift lever 63, the clutch mechanism will engage. For instance, when the shift lever 63 is moved upward in FIG. 3, the clutch will be move into a forward clutch-in position. If the shift lever 63 is continued to be moved in this direction, the clutch will engage the transmission 50 into a forward position or mode.

In the alternative if the operator of the watercraft pulls the shift lever down in FIG. 3, the transmission 50 will eventually, at the end of the neutral range, initially engage the clutch in the reverse mode. As before, further movement of the lever in which direction will fully engage the transmission 50 into the reverse mode.

Figure 4:
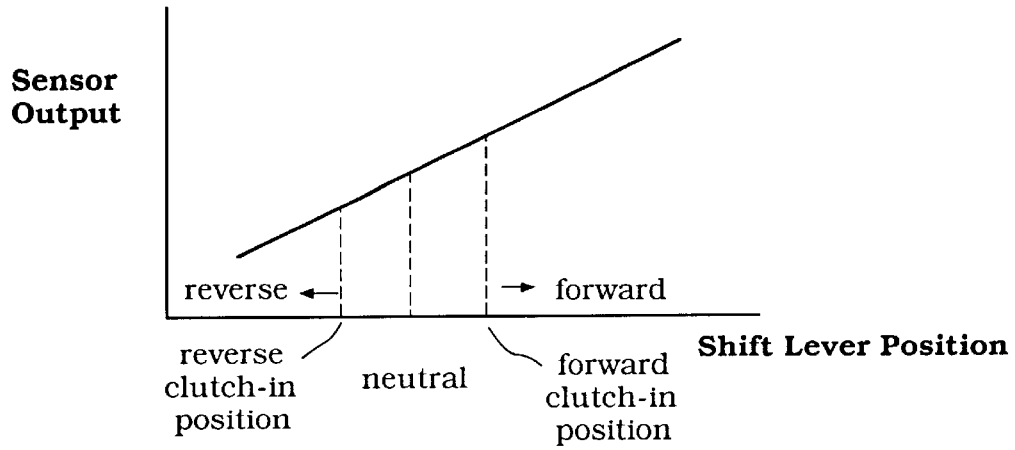
FIG. 4 graphically illustrates the operation device sensor output versus the position of the shifter illustrated in FIG. 3.

FIG. 4 illustrates the output of the sensor 113 associated with the shift lever 63. As illustrated therein, the output value from the sensor 113 increases as the shift lever 63 is moved from the reverse to the reverse clutch-in to neutral to forward clutch-in to forward positions. In the preferred embodiment, the output of the sensor 113 is in the form of an electric voltage.

Figure 5:
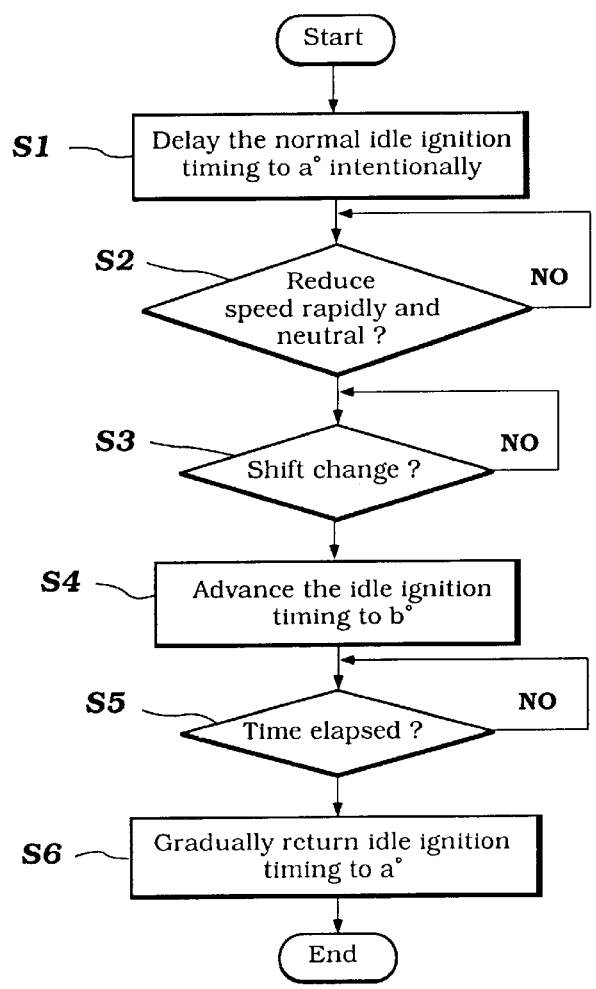
FIG. 5 is a flow chart of a control strategy of the control of the present invention.
Figure 6:
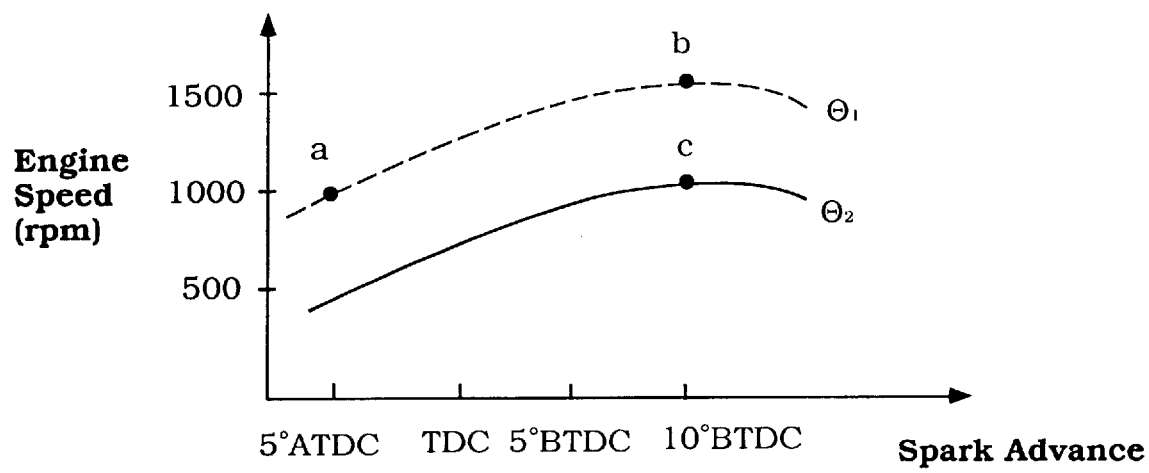
FIG. 6 graphically illustrates engine speed versus spark advance angle for the engine illustrated in FIG. 1 as controlled by the control of the present invention.

FIG. 5 illustrates schematically a control routine of the control 102. Once the engine 22 is started, in a first step S1 the control 102 delays the normal spark timing when the engine 22 is idling. As illustrated in FIG. 6, this timing of $a°$ is retarded substantially from a normal spark timing $c°$. In addition, the throttle valve 80 is preferably opened with a control 122. Under normal idle conditions, the throttle valve 80 is opened by an amount $\theta 2$ and the spark advance is set to $c°$. In accordance with the present invention, however, the throttle valve at idle is opened to an angle $\theta 1$ which is greater than the amount $\theta 2$. In this manner, more air is provided to the engine. At the same time, the spark timing is delayed from normal to $a°$.

Preferably, the timing $a°$ at idle is approximately 5° after top dead center (ATDC) of the piston, whereas the normal spark timing at idle is approximately 10° before top dead center (BTDC) of the piston.

In a next step S2, the control 102 checks to determine if the speed of watercraft or engine is reducing rapidly (such as by monitoring the watercraft speed sensor 114 or shift lever (and thus throttle position) sensor 113). In addition, the control 102 checks to determine whether the transmission has been moved into neutral (such as with data from the shift lever sensor 113).

If both conditions exist, then the control 102 checks in a step S3 to determine if a shift has occurred (such as from the output of the shift lever sensor 113). If no shift occurs, the step is repeated.

If a shift has occurred from neutral to either forward or reverse, then the control 102 advances the timing of the spark firing to a timing $b°$. Once the timing is advanced, a longer combustion time is provided in each combustion chamber, thereby preventing engine stall. As also illustrated in FIG. 6, the throttle angle is also still set larger than at normal idle, thereby permitting a greater amount of air to flow to the engine 22.

In a next step S5, the control 102 checks to determine if a predetermined time has elapsed. If not, the control 102 waits. If so, the control 102 gradually returns the idle ignition timing to the timing $a°$ in a step S6. As an alternate arrangement in this step instead of waiting for a predetermined amount of time to pass, the control 102 may be arranged to not move to step S6 until the engine speed increases to a predetermined speed.

Figure 7:
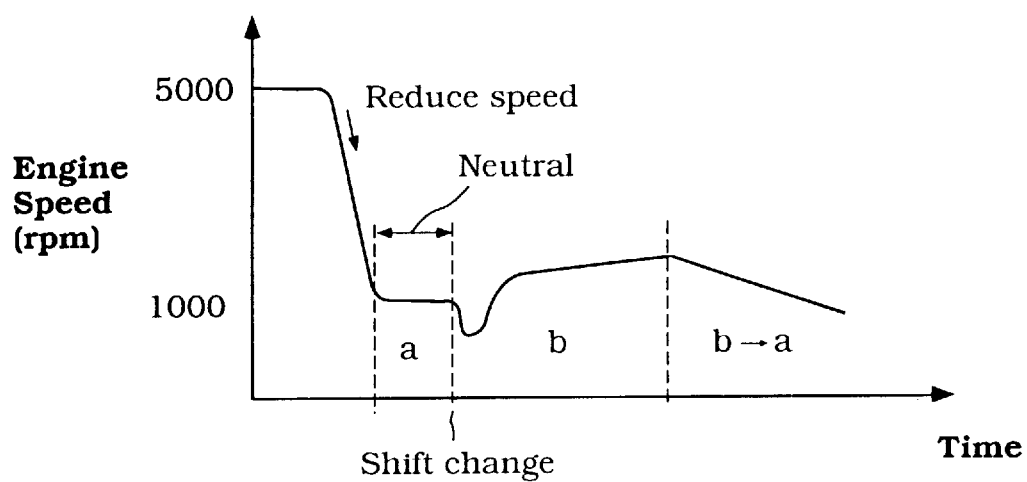
FIG. 7 graphically illustrates engine speed versus time for the engine illustrated in FIG. 1 when a transmission of the motor is shifted.

FIG. 7 illustrates the spark timing zones with respect to engine speed and in relation to shift changes. As illustrated, if the engine speed is quickly reduced to idle, such as by moving the shift and throttle lever 63 to neutral, then the control 102 sets the spark timing to $a°$. If (as in step S3 of FIG. 5) the operator then shifts the shift lever 63 from neutral to forward or reverse, then the control 102 immediately changes the spark advance to $b°$. After some time has elapsed or the engine speed has increased sufficiently, the spark advance is delayed from $b°$ to $a°$.

In this manner, when the engine 22 is idling, sufficient air is provided to the engine to prevent stalling, but since the spark timing is delayed the idle speed is not generally increased. On the other hand, when a load is applied to the engine from idle, such as when the transmission coupled thereto is moved from neutral to reverse or forward, then the spark timing is advanced so that the fuel provided to the engine is permitted to burn for a longer time, increasing engine power and preventing stalling at the time of the transmission shift.

Of course, the foregoing description is that of preferred embodiments of the invention, and various changes and modifications may be made without departing from the spirit and scope of the invention, as defined by the appended claims.

What is claimed is:

1. A marine propulsion unit and control therefore, the marine propulsion unit including a water propulsion device powered by an engine through a transmission, said transmission having at least one drive position in which a transmission gear is drivingly engaged with the water propulsion device so that the water propulsion device is driven by said engine and a non-drive position in which said transmission gear is not drivingly engaged with the water propulsion device so that the water propulsion device is not driven by said engine, said engine having at least one combustion chamber, an air and fuel supply system supplying air and fuel to said combustion chamber, and at least one ignition element corresponding to said combustion chamber for igniting said air and fuel mixture supplied to said combustion chamber by said air and fuel supply system, said control arranged to delay the timing of the firing of said ignition element during engine idle from a normal firing timing when said transmission is in said non-drive position, said control further being arranged to advance the timing of the firing of said ignition element if said engine speed rapidly reduces and said position of said transmission is changed from said non-drive position to said drive position.

2. The marine propulsion unit and control in accordance with claim 1, wherein said air and fuel supply system of said engine includes an air intake passage having a throttle valve movably positioned therein, and wherein said control includes a combined throttle valve and transmission position control for controlling both the position of said throttle valve and the transmission.

3. The marine propulsion unit and control in accordance with claim 1, wherein said transmission has a neutral non-drive position and forward and reverse drive positions and said control advances the firing when said position of said transmission is changed from neutral to forward or reverse and the engine speed rapidly reduces.

4. The marine propulsion unit and control in accordance with claim 1, wherein said engine operates on a four-cycle principle.

5. The marine propulsion unit and control in accordance with claim 1, wherein said control includes means for sensing at least one of the positions of said transmission.

6. A marine propulsion unit and control therefore, the marine propulsion unit including a water propulsion device powered by an engine through a transmission, said transmission having at least one drive position in which the water propulsion device is driven by said engine and a non-drive position in which the water propulsion device is not driven by said engine, said engine having at least one combustion chamber, an air and fuel supply system supplying air and fuel to said combustion chamber, said air and fuel supply system of said engine including an air intake passage having a throttle valve movably positioned therein, and at least one ignition element corresponding to said combustion chamber for igniting said air and fuel mixture supplied to said combustion chamber by said air and fuel supply system, said control arranged to delay the timing of the firing of said ignition element during engine idle from a normal firing timing when said transmission is in said non-drive position and arranged to advance the timing of the firing of said ignition element if said position of said transmission is changed from said non-drive to said drive position, said throttle valve arranged to be positioned at a first angle at normal idle by said control, and said control arranged to move said throttle valve to a second angle greater than said first angle when a speed of said engine is rapidly reduced to idle.

7. A method of controlling a marine propulsion unit including a water propulsion device powered by an engine through a transmission, said transmission having at least one drive position in which the water propulsion device is driven by said engine and a non-drive position in which the water propulsion device is not driven by said engine, said engine having at least one combustion chamber, an air and fuel supply system supplying fuel and air to said combustion chamber, and at least one ignition element corresponding to said combustion chamber for igniting said air and fuel mixture supplied to said combustion chamber comprising the steps of delaying the timing of firing of said ignition element during engine idle from a normal firing timing, determining if said transmission is moved from said non-drive position to said drive position and if so, advancing the timing of the firing of said ignition element, and sensing a speed of said engine and delaying said timing of said firing of said ignition element from said advanced firing after said engine speed increases beyond a predetermined speed.

8. A method of controlling a marine propulsion unit including a water propulsion device powered by an engine through a transmission, said transmission having at least one drive position in which the water propulsion device is driven by said engine and a non-drive position in which the water propulsion device is not driven by said engine, said engine having at least one combustion chamber, an air and fuel supply system supplying fuel and air to said combustion chamber, and at least one ignition element corresponding to said combustion chamber for igniting said air and fuel mixture supplied to said combustion chamber comprising the steps of delaying the timing of firing of said ignition element during engine idle from a normal firing timing, determining if said transmission is moved from said non-drive non-drive to said drive position and if so, advancing the timing of the firing of said ignition element, and determining if a predetermined amount of time has elapsed, and if so, delaying said timing of said firing of said ignition element from said advanced firing.

9. A method of controlling a marine propulsion unit arranged to propel a watercraft, said marine propulsion unit including a water propulsion device powered by an engine through a transmission, said transmission having at least one drive position in which the water propulsion device is driven by said engine and a non-drive position in which the water propulsion device is not driven by said engine, said engine having at least one combustion chamber, an air and fuel supply system for supplying fuel and air to said combustion chamber, and at least one ignition element corresponding to said combustion chamber for igniting said air and fuel mixture supplied to said combustion chamber comprising the steps of delaying the timing of firing of said ignition element during engine idle from a normal firing timing, determining if said transmission is moved from said non-drive to said drive position and if so, advancing the timing of the firing of said ignition element, and advancing the firing of said ignition element if said speed of said watercraft is reduced rapidly and said transmission is moved from said non-drive position to said drive position.

10. A marine propulsion unit and control therefore, the marine propulsion unit including a water propulsion device powered by an engine through a transmission, said engine having at least one combustion chamber, an air supply system including an air intake passage having a throttle valve movably positioned therein, a fuel supply system, and at least one ignition element corresponding to said combustion chamber for igniting an air and fuel mixture supplied to said combustion chamber, a combined throttle valve and transmission control lever, said lever arranged to change the position of said throttle valve and to change the position of said transmission between forward, neutral and reverse, said control arranged to delay the firing of said ignition element during engine idle from a normal idle firing timing when said lever is moved rapidly to a position corresponding to engine idle throttle valve position and neutral transmission position and arranged to advance the firing of said ignition element if said lever is moved from the neutral to the reverse or forward position.

* * * * *